United States Patent [19]
Wijts

[11] Patent Number: 4,773,321
[45] Date of Patent: Sep. 27, 1988

[54] UNIVERSAL STERILIZING APPARATUS

[75] Inventor: Corneel C. Wijts, Saratoga, Calif.

[73] Assignee: FMC Corporation, Chicago, Ill.

[21] Appl. No.: 87,373

[22] Filed: Aug. 20, 1987

[51] Int. Cl.⁴ .............................................. A23L 1/00
[52] U.S. Cl. ...................................... 99/468; 99/361; 99/470; 99/477; 99/483; 422/304
[58] Field of Search ................ 99/330, 483, 354–360, 99/361–371, 403, 404, 409, 516, 443 C, 534, 536, 477, 478, 467–470, 474–476; 414/257, 240; 426/232, 523, 407, 412; 422/25, 302, 297, 304; 104/48, 167; 198/465.1, 465.2

[56] References Cited
U.S. PATENT DOCUMENTS

| | | | |
|---|---|---|---|
| 4,085,668 | 4/1978 | Mughannam | 99/359 X |
| 4,089,322 | 5/1978 | Guibert | 99/355 X |
| 4,169,408 | 10/1979 | Mencacci | 99/355 |
| 4,646,629 | 3/1987 | Creed et al. | 99/468 |

Primary Examiner—Timothy F. Simone
Attorney, Agent, or Firm—L. B. Guernsey; R. B. Megley; H. M. Stanley

[57] ABSTRACT

A universal sterilizer for processing products packages in a wide variety of types and shapes of containers. Fluids for sterilizing and cooling products in the containers are directed horizontally toward the sides of the containers to provide uniform processing of the products. This can be used with either batch process of products or used in a continuous type sterilizers. Small quantities of water can be pumped around the system to reduce cost of operation.

29 Claims, 3 Drawing Sheets

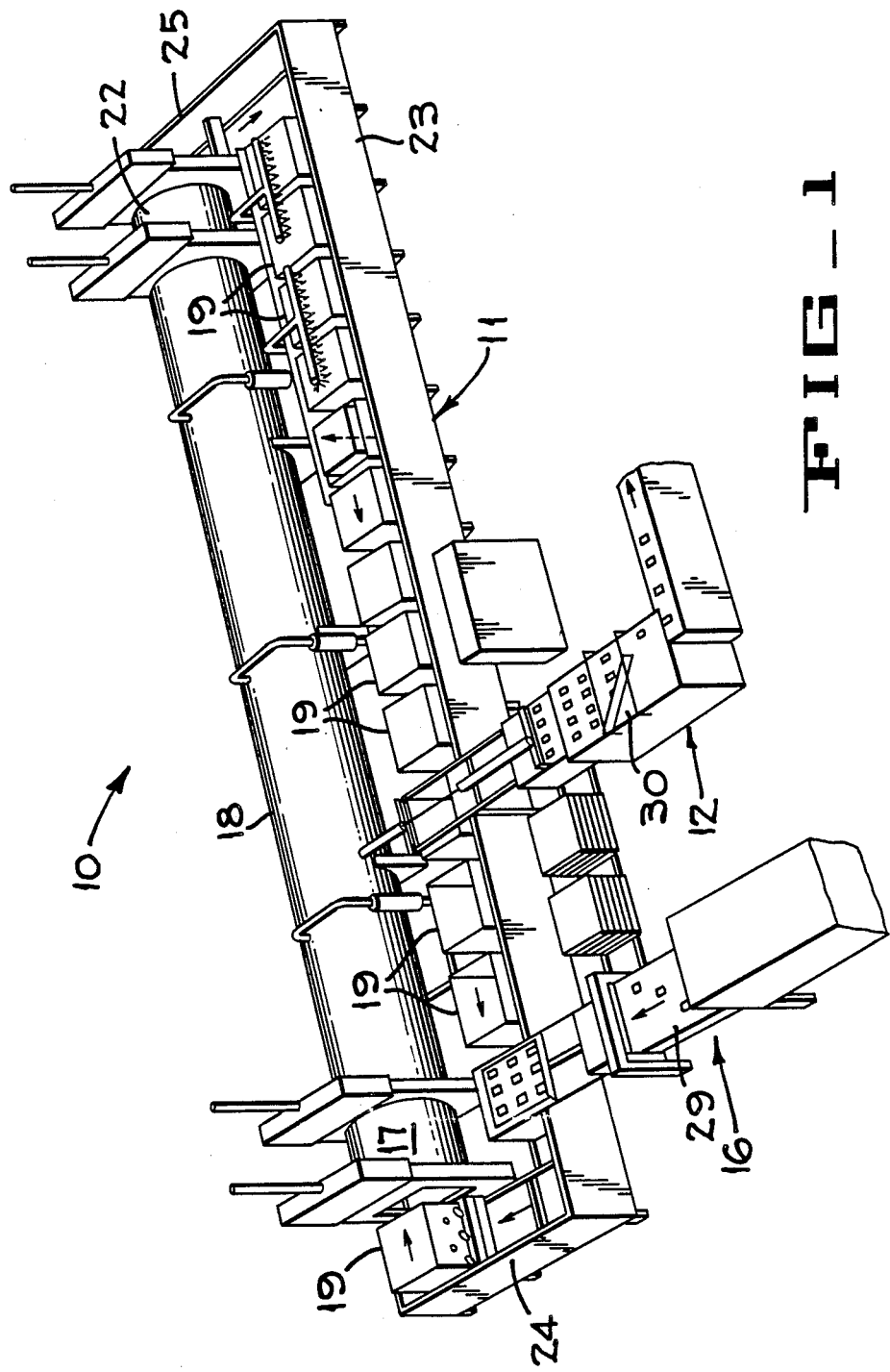
FIG_1

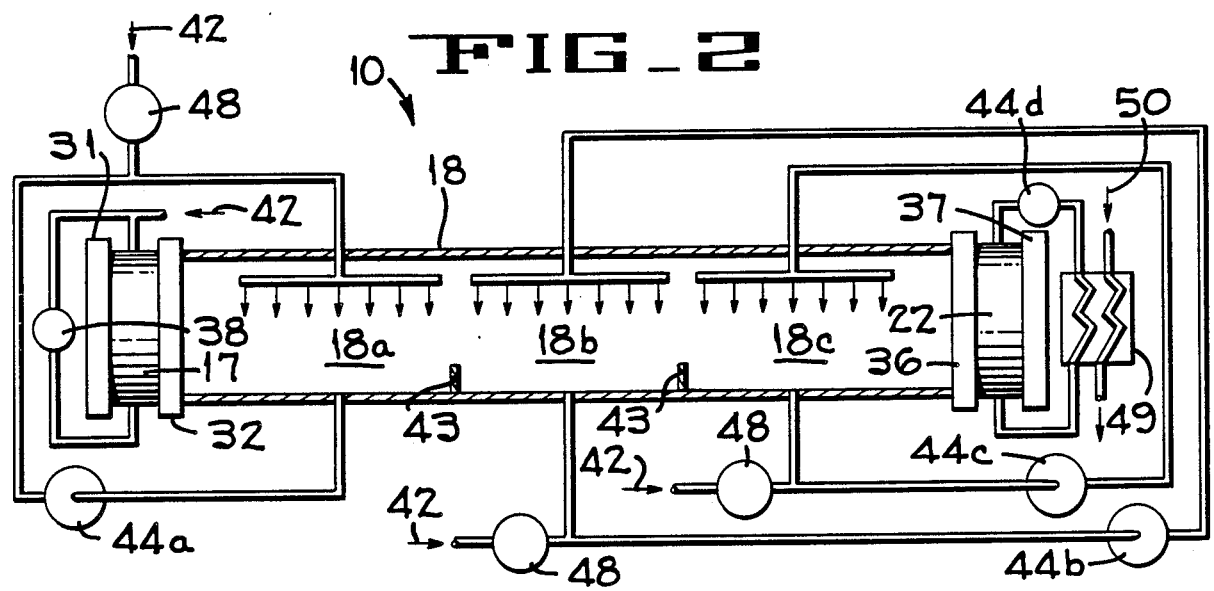
FIG_2
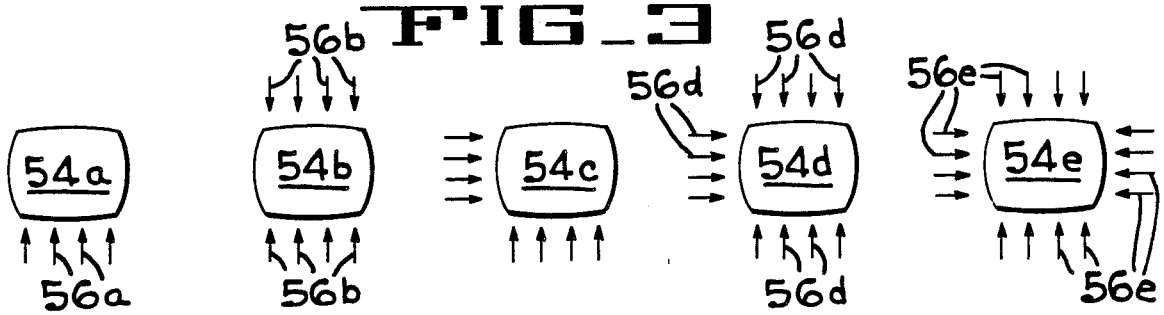
FIG_3
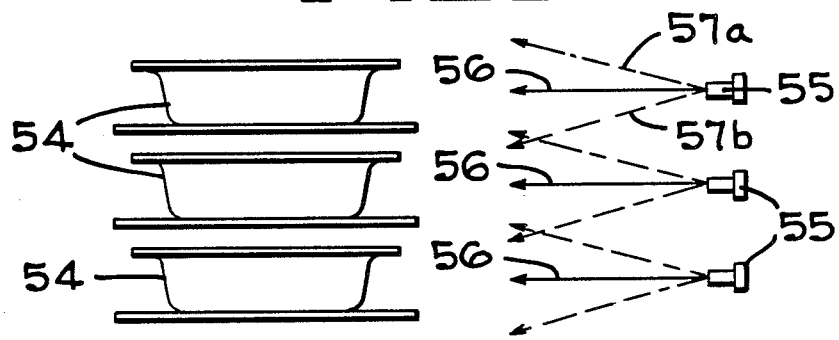
FIG_4
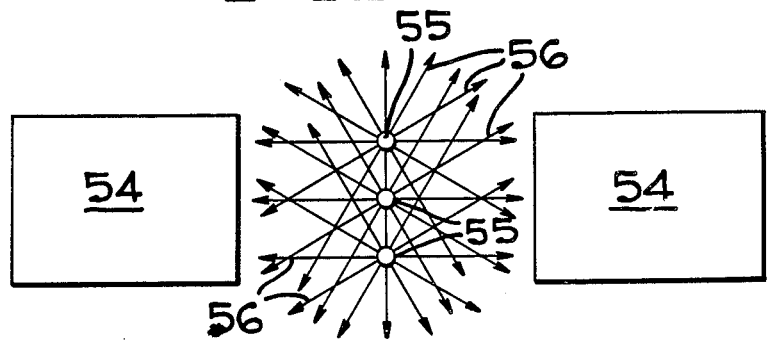
FIG_5

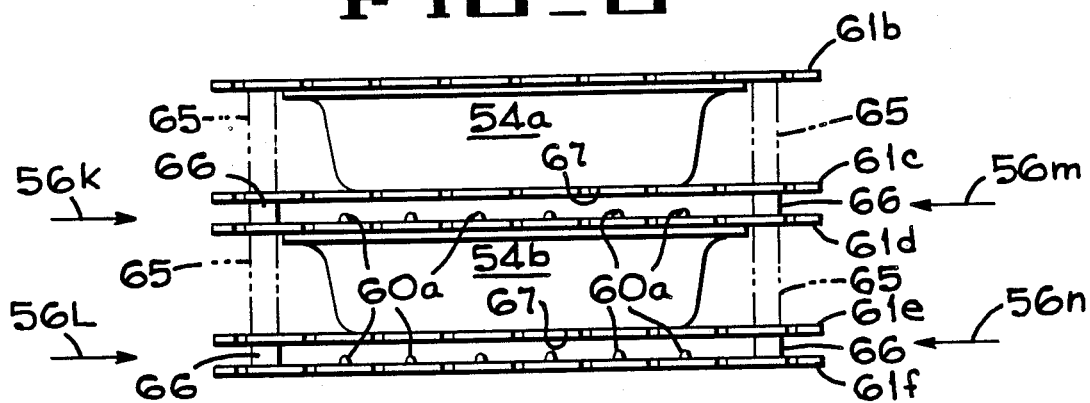
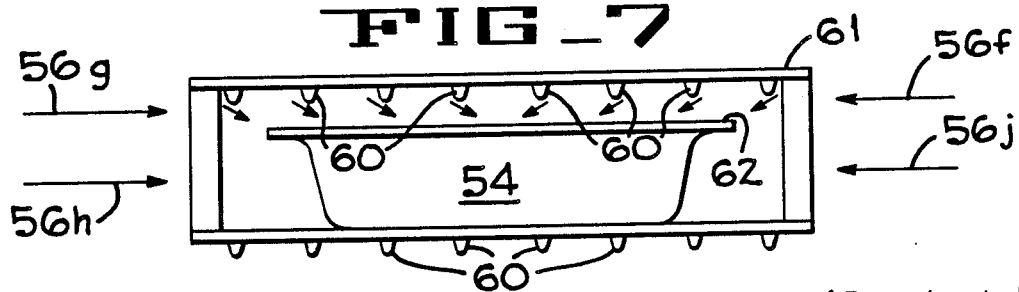
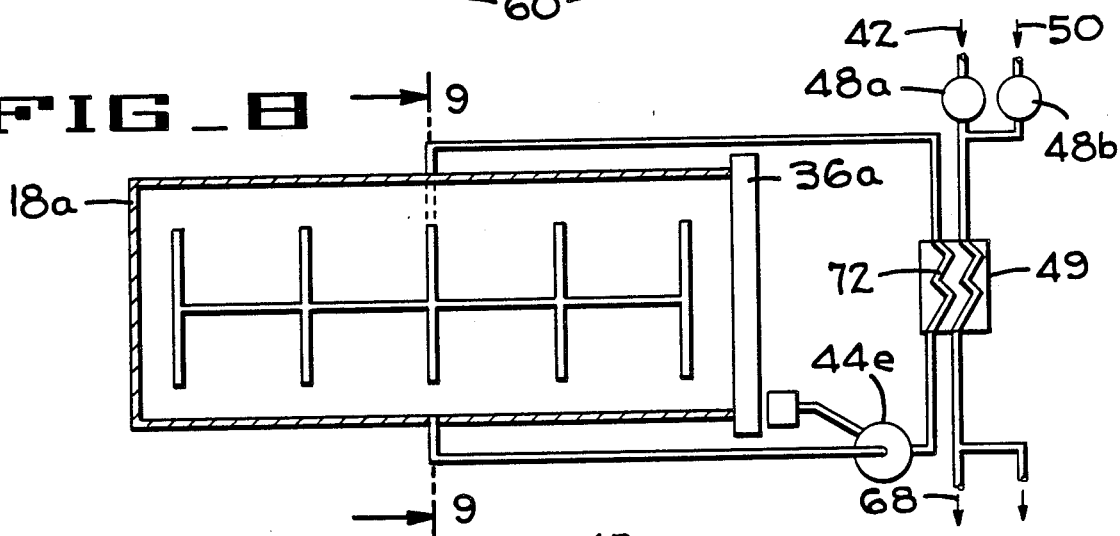
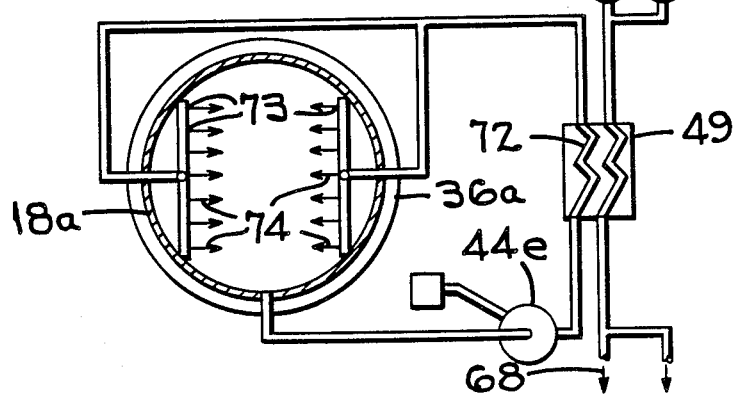

4,773,321

UNIVERSAL STERILIZING APPARATUS

BACKGROUND OF THE INVENTION

This invention relates to apparatus for sterilizing food products, and more particularly, to a sterilizer that accepts a wide range of types of containers.

A prior art patent which is relevant to the present invention is the U.S. Pat. No. 4,646,629 issued to Sherman H. Creed et al, Mar. 3, 1987. The Creed et al Patent is assigned to the assignee of the present invention and by reference thereto it is intended that it be incorporated herein.

SUMMARY OF THE INVENTION

The present invention discloses a universal sterilizing apparatus having a plurality of mobile cars for supporting packaged products such as food or pharmeceuticals. The packaged products are moved in a closed circuit having means for sequentially loading and unloading each car with packages, means for introducing successive cars laden with packages into an entry lock where preliminary heating and pressurization of the cars and the packages ordered thereby occurs, thereafter moving the cars from the entry lock to a sterilizing chamber where the residence time of each car is sufficient to effect sterilization of the packaged products, moving the cars from the sterilizing chamber to a discharge lock where partial cooling and depressurization to ambient pressure occurs, moving the car from the discharge lock to a further cooling station, and finally moving each car to unloading and loading stations.

A relatively small pump can be used to circulate fluid for heating or cooling each of the sections of the sterilizer. Steam can be added to the circulating fluid in the entry and sterilizing portions of the sterilizer so that only a small amount of fluid is needed. A heat exchanger can be used to cool fluid used in the discharge portion of the sterilizer where a small amount of cooling fluid is recirculated.

To facilitate processing of a variety of shapes of packages, fluid is directly generally horizontally against the packages. To allow the horizontally directed fluid to reach the packages the sides of the mobile cars are made in the form of a wire basket. The packages may be supported by a plurality of horizontal shelves separated by a plurality of spacers so packages on the lower shelves are not damaged by the weight of packages on the upper shelves. Deflectors on the surfaces of the shelves deflect the horizontal fluid against the top and bottom of the packages so all portions of the packages receive streams of fluid for processing contents of the packages.

Another universal sterilizing apparatus of the present invention includes a batch type sterilizer having one or more mobile cars for supporting packaged products. The car and packages are moved into a chamber where the packages are processed by horizontally directed sterilizing fluid followed by horizontally directed cooling fluid. Fluid directed against the top and/or bottom of the packages aid in providing uniform processing of the contents of the packages.

BRIEF DESCRIPTION OF THE DRAWINGS

FIG. 1 is a perspective view of the sterilizing apparatus disclosing the compartmentalized treatment vessel, the mobile cars and the path followed by the cars.

FIG. 2 is a diagrammatic sectional view of the sterilizing apparatus of FIG. 1 showing the various processing compartments.

FIG. 3 is a diagrammatic plan view illustrating a plurality of arrangements of horizontal streams of fluid which can be directed against the sides of a packaged product.

FIG. 4 is a diagrammatic side view of packages with oscillating jets directing streams of fluid against sides of the packages.

FIG. 5 is a diagrammatic top view of packages with rotating jets directing streams of fluid against the packages.

FIG. 6 is a diagrammatic side view of packages on shelves separated by a plurality of shelf spacers.

FIG. 7 is a diagrammatic side view of packages on shelves having deflectors for deflecting the horizontal streams of fluid onto the tops of the containers.

FIG. 8 is a diagrammatic sectional view of a batch processing apparatus of the present invention.

FIG. 9 is a diagrammatic sectional view taken along line 9—9 of FIG. 8.

DESCRIPTION OF THE PREFERRED EMBODIMENT

The sterilizing apparatus constructed in accordance with the principles of this invention is shown in FIG. 1 and is generally designated by the numeral 10. In general, the apparatus comprises a frame structure 11 rollingly supporting and guiding a plurality of mobile cars in a closed path to effect sequential unloading of each car at an unloading station 12, to load each car at a loading station 16, to introduce each car in a sterilizing apparatus comprising an inlet lock 17, a sterilizing chamber 18 and a discharge lock 22. Processing fluids, which can be water, air and/or steam or other suitable gasses or liquids are supplied to the sterilizing chamber 18 and to the inlet and outlet locks 17 and 22, respectively.

The frame structure 11 (FIG. 1) is of generally rectangular configuration formed with an elongated section 23, and a pair of transverse sections 24, 25. Details of means for transferring a plurality of cars 19 from a conveyor 29 through section 24, inlet lock 17, sterilizing chamber 18, discharge lock 22 and a conveyor 30 are shown in the Creed et al U.S. Pat. No. 4,646,629 and are not considered to be a part of this invention.

The inlet lock 17 (FIG. 2) is defined by an exterior door 31 and an interior door 32. In a like manner discharge lock 22 is defined by an interior door 36 and an exterior door 37. When a car is located in inlet block 17 and doors 31, 32 are closed, a variety of pressure, temperature and atmospheric conditions can be created by using a pump 38 to circulate water to which steam may be added from a source of steam 42. Sterilizing chamber 18 can be divided into a plurality of subchambers 18a, 18b, 18c by a plurality of baffles 43 so that each of the subchambers can be operated at different temperatures. Fluid is circulated by a plurality of pumps 44a–44c and steam from a plurality of sources 42 can be added to the circulating fluid through a plurality of valves 48 to bring each subchamber to the desired temperature. When processing in chamber 18 is completed, door 36 is opened and a car moved into discharge lock 22. Door 36 is closed and cool water pumped into the car and contents by a pump 44d. A heat exchanger 49 uses cool fluid from a source of cooling 50 to reduce temperature of the water pumped into the lock 22. After the temperature of the car and contents have been lowered, door 37 is opened and the car removed from the lock 22.

When cylindrical cans are processed in the sterilizer a mixture of hot water and steam can be cascaded downward (FIG. 2) onto the cans. However, some of the other types of containers such as a plurality of plastic containers 54 shown in FIG. 4 can experience uneven and incomplete processing of contents when hot fluid is directed only on top of the containers. The present invention uses a plurality of jets 55 to direct fluid 56 in a generally horizontal manner against the sides of containers 54 as shown in the side elevation of FIG. 4 and in the plan views of FIG. 3. The fluid 56a can be directed toward one side of a container 54a as shown in the left portion of FIG. 3 or the fluid can be directed against two sides of the containers as shown with containers 54b, 54c. FIG. 3 shows a plurality of streams of fluid 56d directed against three sides of the container and streams 56e are direct against all four sides of container 54e.

The jets 55 (FIG. 4) can provide more complete processing of the contents of containers 54 by oscillating in an up-and-down direction to direct streams 56 between a position 57a and a position 57b. Jets 55 can also be rotated as shown in FIG. 5 to direct streams 56 over a relatively wide area toward containers 54.

More uniform processing of the contents of large containers 54 (FIG. 7) can be obtained by using a plurality of deflectors 60 on the underside of a spacer plate 61 to deflect streams of fluid 56f, 56g downwardly onto a top portion 62 of containers 54. Other streams of fluid 56h, 56j are directed against the sides of container 54.

A plurality of double spacer plates 61c–61d, 61e–61f shown in FIG. 6 are separated by a plurality of spacers 65, 66. The arrangement shown in FIG. 6 is used to support the weight of spacer plates 61b–61d when fragile containers 54a, 54b are being processed. When sturdy containers are being processed the spacers 65 can be removed so the weight of the spacer plates 61b–61d and the upper container 54a is supported by container 54b. This arrangement secures the containers 54a, 54b in position and prevents the containers from bouncing about when streams of fluid (not shown) are directed against the containers. A spacer plate 61b prevents container 54a from bouncing, and the weight of container 54a, and spacer plates 61c, 61d prevent container 54b from bouncing. The spacer plates can be made of a wire mesh to allow vertical movement of fluid through the spacer plates. A plurality of deflectors 60a on plates 61d, 61f deflect streams of fluid 56k–56n in a generally upward direction against a bottom portion 67 of containers 54a, 54b to aid in processing contents of the containers. Spacers 66 should be spaced apart to prevent interference with horizontal streams of fluid directed toward containers 54a, 54b.

Another embodiment of the present invention includes a batch type sterilizing apparatus 10a shown in FIGS. 8 and 9. A sterilizing chamber 18a has a door 36a at one end for admitting a mobile car and containers into the chamber 18a. The door 36a is closed to seal the chamber 18a and steam and/or hot liquid from a source 42 is directed through a valve 48a to a heat exchanger 49 to an exit 68. A pump 44e circulates a liquid through a pipe 72 of heat exchanger 49 to a plurality of jets 73 which supplies horizontally directed streams of fluid 74 to heat package (not shown) inside chamber 18a. When products in the packages have been sufficiently "cooked" or heated, valve 48a is closed and a valve 48b is open to connect a source of cooling 50 to heat exchanger 49. Pump 44e then circulates cooling liquid to the packages inside chamber 18a. The double spacer plates 61c–61f and spacers 66 of FIGS. 6, 7 can be used inside chamber 18a in the manner described above. When the process of heating and cooling is completed, door 36a is opened and the car load of processed containers is removed from chamber 18a.

The present invention can be used to process cylindrical cans of food or other material and a wide variety of other shapes and sizes of containers can be used. A plurality of horizontally directed processing fluid facilitates uniform processing of the contents of the containers.

Although the best mode contemplated for carrying out the present invention has been herein shown and described, it will be apparent that modification and variation may be made without departing from what is regarded to be the subject matter of the invention.

What is claimed is:

1. A universal sterilizer for using a relatively small amount of circulating liquid for processing products, said sterilizer comprising:
   at least one mobile car for holding a plurality of packages containing thermally treatable products;
   a pressurizing chamber;
   a sterilizing chamber;
   a depressurizing chamber;
   a station for supplying cool water to the car and to the packages;
   means for moving said car sequentially to said pressurizing chamber, said sterilizing chamber, said depressurizing chamber and said cooling station; and
   a plurality of jets for directing a plurality of jet streams of liquid in a generally horizontal manner to spray said liquid against a side portion of said packages for processing said products in said packages.

2. A universal sterilizer as defined in claim 1 including means for directing streams of liquid downward in a generally vertical manner against a top portion of said packages.

3. A universal sterilizer as defined in claim 1 including means for deflecting a portion of said horizontal streams of liquid upward to direct said deflected portion against a bottom portion of said packages.

4. A universal sterilizer as defined in claim 1 including means for deflecting a portion of said horizontal streams of liquid downward to direct said deflected portion against a top portion of said packages.

5. A universal sterilizer as defined in claim 1 including means for vertically deflecting a portion of said streams of liquid to direct said deflected portion against a top and a bottom portion of said packages to provide uniform processing of said products.

6. A universal sterilizer as defined in claim 1 including means for providing an up-and-down movement of said directing means to direct said streams of liquid above and below a horizontal plane as said liquid moves toward said packages.

7. A universal sterilizer as defined in claim 1 including baffle means for dividing said sterilizing chamber into a plurality of subchambers; a plurality of sources of sterilizing energy; and means for connecting each of said sterilizing sources to a corresponding one of said subchambers.

8. A universal sterilizer as defined in claim 1 including a plurality of double spacer plates for supporting said packages; and a plurality of separation means mounted between said spacer plates, said separation means supporting said spacer plates to facilitate the movement of liquid against said packages.

9. A universal sterilizer as defined in claim 1 including means for collecting said liquid and recirculating said collected liquid against said packages, and means for controlling the temperature of said recirculated liquid to provide optimum processing of said products.

10. A universal sterilizer as defined in claim 1 including means for collecting said liquid, a pump for recirculating said liquid against said packages, and means for adding steam to said liquid to insure a proper processing temperature for said liquid.

11. A universal sterilizer as defined in claim 1 including means for collecting liquid in each of said chambers, a plurality of pumps, means for connecting each of said pumps to recirculate liquid in a corresponding one of said chambers, and means for controlling the temperature of said recirculating liquid in each of said chambers to insure optimum processing of said products.

12. A universal sterilizer for using a relatively small amount of circulating liquid for processing products, said sterilizer comprising:
    at least one mobile car for holding a plurality of packages containing thermally treatable products;
    a pressurizing chamber;
    a sterilizing chamber;
    a station for supplying cool water to the car and to the packages;
    means for moving said car sequentially to said pressurizing chamber, said sterilizing chamber, said depressurizing chamber and said cooling station; and
    a plurality of jets for directing a plurality of jet streams of liquid in a generally vertical manner to spray said liquid against said packages for processing said products in said packages.

13. A universal sterilizer as defined in claim 12, including means for deflecting a portion of said vertical stream of liquid sidewards to direct said deflected portion against a side portion of said packages.

14. A universal sterilizer as defined in claim 12 including means for providing a side-to-side movement of said directing means to direct liquid across an upper portion of said packages.

15. A universal sterilizer as defined in claim 12 including baffle means for dividing said sterilizing chamber into a plurality of subchambers; a plurality of sources of sterilizing energy; and means for connecting each of said sterilizing sources to a corresponding one of said subchambers.

16. A universal sterilizer as defined in claim 12 including a plurality of double spacer plates for supporting said packages; and a plurality of separation means mounted between said spacer plates, said separation means supporting said spacer plates to facilitate the movement of liquid against said packages.

17. A universal sterilizer as defined in claim 12 including means for collecting said liquid and recirculating said collected liquid against said packages, and means for controlling the temperature of said recirculated liquid to provide optimum processing of said products.

18. A universal stabilizer as defined in claim 12 including means for collecting said liquid, a pump for recirculating said liquid against said packages, and means for adding steam to said liquid to insure a proper processing temperature for said liquid.

19. A universal sterilizer as defined in claim 12 including means for collecting liquid in each of said chambers, a plurality of pumps, means for connecting each of said pumps to recirculate liquid in a corresponding one of said chambers, and means for controlling the temperature of said recirculating liquid in each of said chambers to insure optimum processing of said products.

20. A batch type sterilizer comprising:
    at least one mobile car for holding a plurality of packages containing thermally treatable products;
    a sealable chamber for receiving said car;
    means for moving said car into said chamber for processing said products and for moving said car with processed products from said chamber;
    means for providing sterilizing fluid to said chamber;
    means for providing cooling fluid to said chamber; and
    a plurality of jets for sequentially directing a plurality of jet streams of said sterilizing fluid and said cooling fluid in a generally horizontal manner to spray said fluid against a side portion of said packages for processing said products in said packages.

21. A batch type sterilizer as defined in claim 20 including means for directing streams of fluid in a generally vertical manner against a top portion of said packages.

22. A batch type sterilizer as defined in claim 20 including means for deflecting a portion of said horizontal fluid upward to direct said deflected portion against a bottom portion of said packages.

23. A batch type sterilizer as defined in claim 20 including means for deflecting a portion of said horizontal fluid downward to direct said deflected portion against a top portion of said packages.

24. A batch type sterilizer as defined in claim 20 including means for vertically deflecting a portion of said horizontal fluid to direct said deflected portion against a top and a bottom portion of said packages to provide uniform processing of said products.

25. A batch type sterilizer as defined in claim 20 including means for providing an up-and-down movement of said directing means to direct said streams of fluid above and below a horizontal plane as said fluid moves toward said packages.

26. A batch type sterilizer as defined in claim 20 including a plurality of double spacer plates for supporting said packages; and a plurality of separation means mounted between said spacer plates, said separation means supporting said spacer plates to facilitate the movement of fluid against said packages.

27. A batch type sterilizer as defined in claim 20 including means for collecting said fluid and recirculating said collected fluid against said packages, and means for controlling the temperature of said recirculated fluid to provide optimum processing of said products.

28. A batch type sterilizer as defined in claim 20 including means for collecting said fluid, a pump for recirculating said fluid against said packages, and means for adding steam to said fluid to insure a proper processing temperature for said fluid.

29. A batch type sterilizer as defined in claim 28 including means for cooling said fluid to provide cooling of said products.

* * * * *